United States Patent [19]

Chow

[11] Patent Number: 5,054,693
[45] Date of Patent: Oct. 8, 1991

[54] PORTABLE DISTRIBUTOR FOR SEEDS OR FERTILIZER

[76] Inventor: Jessie Chow, No. 15-30, Kuang Ming Rd., Hsi Twen Chu, Taichung, Taiwan

[21] Appl. No.: 540,859

[22] Filed: Jun. 19, 1990

[51] Int. Cl.⁵ .................. B65D 47/28; A01C 17/00
[52] U.S. Cl. .................................. 239/681; 239/684; 239/687
[58] Field of Search .............. 239/681, 650, 684, 687; 222/626, 505

[56] References Cited

U.S. PATENT DOCUMENTS

| | | | |
|---|---|---|---|
| 4,234,131 | 11/1980 | Baker | 239/687 |
| 4,588,133 | 5/1986 | Brabb et al. | 239/681 |
| 4,597,531 | 7/1986 | Kise | 239/687 |
| 4,681,265 | 7/1987 | Brabb et al. | 239/687 |
| 4,867,381 | 9/1989 | Speicher | 239/687 |

Primary Examiner—Andres Kashnikow
Assistant Examiner—Lesley Morris
Attorney, Agent, or Firm—Dellett, Smith-Hill and Bedell

[57] ABSTRACT

A portable distributor has a handle coupled to a body by a rod. A tank is disposed on the body for storing seeds to be distributed. An aperture is formed in the upper portion of the body. An opening is formed in said body. A stirrer which is located in the opening is fixed to a shaft. The stirrer is driven by a motor in order to distribute the seeds which flow into the opening via the aperture.

4 Claims, 5 Drawing Sheets

PORTABLE DISTRIBUTOR FOR SEEDS OR FERTILIZER

BACKGROUND OF THE INVENTION

The present invention relates to a distributor, and more particularly to a portable distributor for seeds or fertilizer.

Fertilizer or seeds are generally distributed manually by the farmers who have only a small land. Normally, it is impossible for the seeds or fertilizer to be distributed homogeneously or evenly with manual labor. A mechanical or electrical device is highly desired.

SUMMARY OF THE INVENTION

The primary objective of the present invention is to provide a portable distributor for seeds or fertilizer which distributes seeds or fertilizer evenly or homogeneously.

In accordance with one aspect of the invention, there is provided a portable distributor which includes a handle portion coupled to a body by a rod. A tank is disposed on the body for storing seeds or fertilizer to be distributed. A trigger is pivoted to the handle portion. One end of a cable is connected to a free end of the trigger. A hollow space is formed in an upper end of the body for receiving a lower end of the tank. An aperture is formed in a lower end of the hollow space. The body is separated into an upper part and a lower part by an opening. A control plate is provided in the upper part of the body below the hollow space and is coupled to the cable. The aperture is controlled to be opened or closed by the control plate which is controlled by the trigger via the cable. A shaft is rotatably provided between the upper part and the lower part of the body. A stirrer which is located in the opening is fixed to the shaft. A motor is coupled to the shaft for driving the shaft. When the aperture is opened, the seeds or fertilizer which flow into the opening via the aperture is motivated by the stirrer in order to be distributed.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
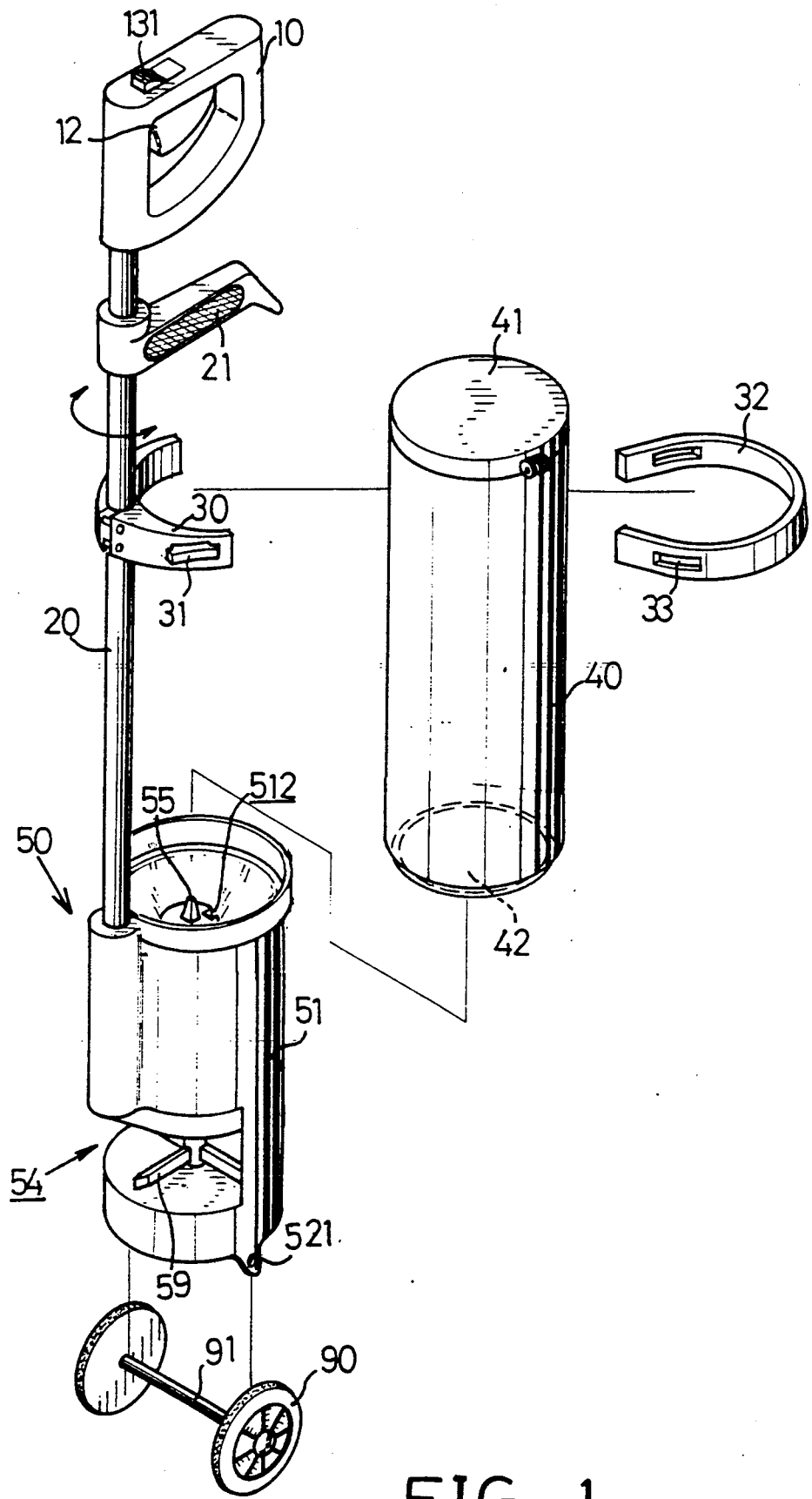
FIG. 1 is an exploded view of a portable distributor for seeds or fertilizer in accordance with the present invention.
Figure 2:
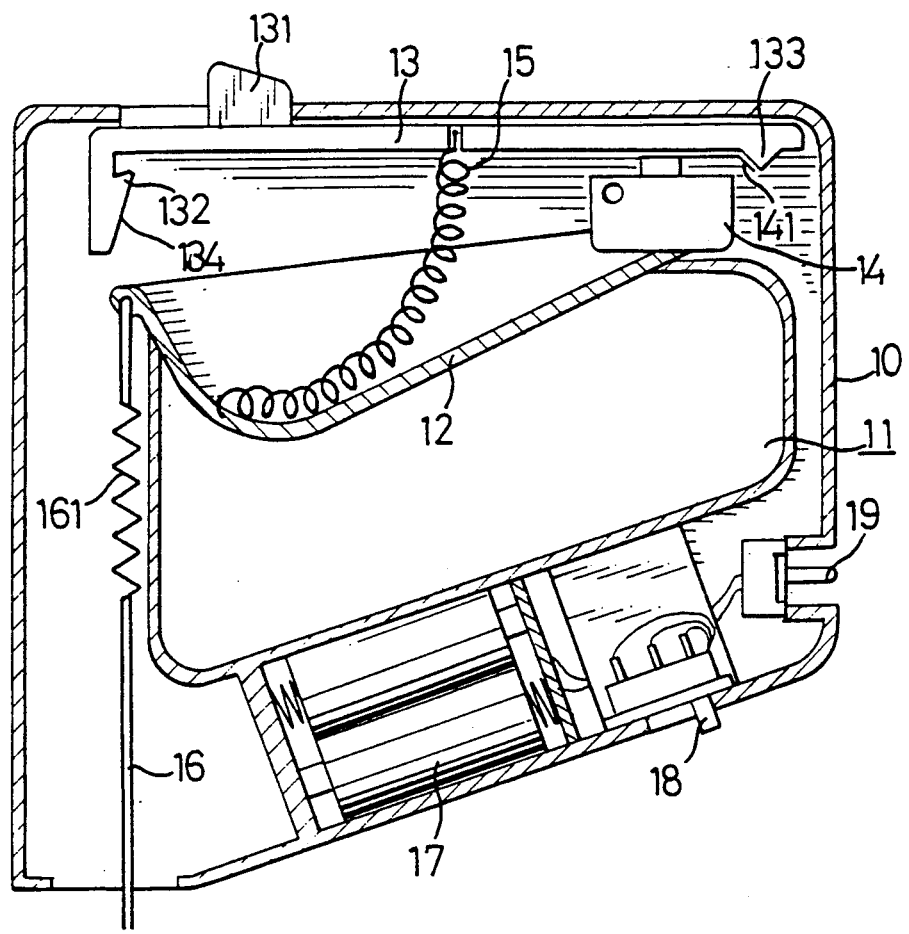
FIG. 2 is a cross sectional view of a handle portion of the portable distributor.
Figure 3:
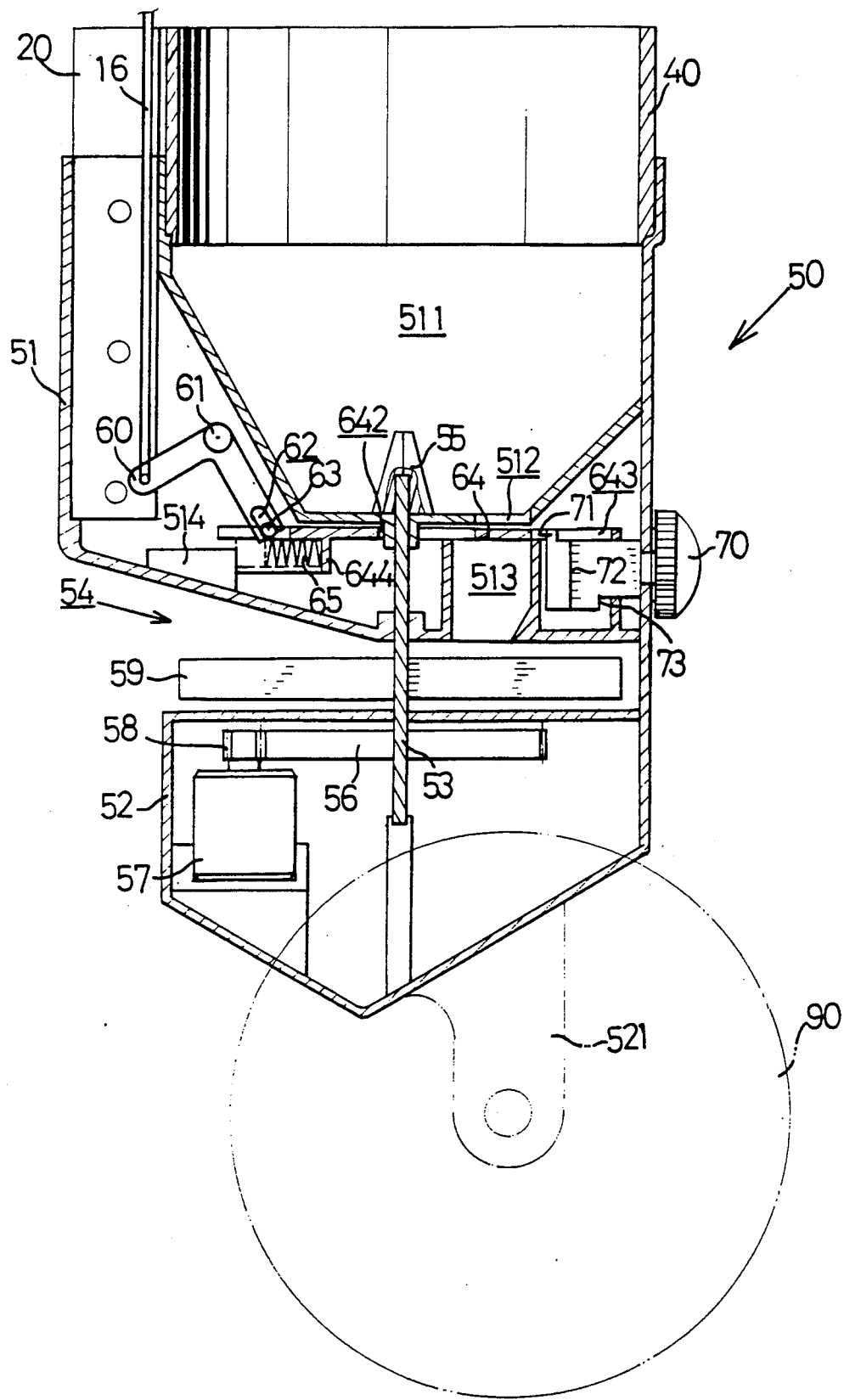
FIG. 3 is a cross sectional view of the body of the portable distributor.

Referring to the drawings and initially to FIGS. 1, 2 and 3, a portable distributor for seeds or fertilizer in accordance with the present invention comprises generally a handle portion 10 coupled to a body 50 by a rod 20; and a tank 40 disposed upon the body 50.

The handle portion 10 is substantially trapezoidal with an emptiness 11 formed in a center thereof. A hole 101 is formed in an upper end of the handle portion 10. A rear end of a trigger 12 is pivoted to an upper and rear end of the handle portion 10 and is rotatable about the pivot axle 122. The front and lower portion of the trigger 12 is located in the emptiness 11. An L-shaped retaining plate 13 is laterally provided in the upper portion of the handle portion 10. A button 131 is fixed to the front and upper surface of the retaining plate 13 and extends through the hole 101. A hook 132 is formed on the front and lower end of the retaining plate 13. A tapered surface 134 is formed below the hook 132. A protuberance 133 is formed in the rear and lower surface of the retaining plate 13. A compression spring 15 is biased between the trigger 12 and the retaining plate 13 so that the trigger 12 is pushed downward and the retaining plate 13 is pushed rearward by the spring 15. A microswitch 14 with a resilient element 141 is fixed in the rear and upper portion of the handle portion 12. The resilient element 141 is pressed downward when the protuberance 133 of the retaining plate 13 is caused to move forward in order to control the microswitch 14.

When the trigger 12 is pulled upward against the spring 15, the front end of the trigger 12 is caused to slide along the tapered surface 134 until the front end of the trigger 12 is engaged with the hook 132. Alternatively, when the button 131 is pushed forward, the trigger 12 can be pulled up, and the front end of the trigger 12 is engaged with the hook 132 when the button 131 is released. The front portion of the trigger 12 can be released and rotated downward when the button 131 of the retaining plate 13 is pushed forward. A cable 16 which is substantially extended in the rod 20 is connected to the front end of the trigger 12 via a spring element 161. Two batteries 17, a switch 18 and a socket 19 are disposed in the lower part of the handle portion 10. The batteries 17 provide a power supply to the distributor. An external power supply can be supplied into the distributor from the socket 19.

An auxiliary handle 21 is disposed on the rod 20 below the handle portion 10. This auxiliary handle 21 is optional and is provided for facilitating a handling or an operation of the distributor. A clamping frame 30 with two lugs 31 is fixed on the rod 20 below the auxiliary handle 21. A clamping ring 32 has two holes 33 for engagement with the lugs 31 of the clamping frame 30 so as to clamp the tank 40 upon the body 50. The tank 40 is removable or detachable by releasing the clamping ring 32. A lid 41 is pivoted on the upper end of the tank 40 which has an open lower end 42. Alternatively, the tank 40 may be directly fixed upon the body 50 and is not removable, and the lid 41 is directly coupled to the rod 20 instead of pivoted to the upper end of the tank 40. The seeds which are to be distributed are disposed or stored in the tank 40. The agitator 55 agitates the seeds for facilitating a flow of the seeds.

An opening 54 is formed in a center portion of the body 50 so that the body 50 is substantially separated into an upper part 51 and a lower part 52. A hollow space 511 and an aperture 512 are formed in an upper end of the upper part 51. A channel 513 is formed in the upper part 51 below the aperture 512 so that seeds from the tank 4 may flow through the aperture 512 into the channel 513. A shaft 53 is vertically and rotatably supported between the two parts 51, 52 of the body 50. An agitator 55 is fixed to the upper end of the shaft 53 and a gear 56 is fixed to the lower end of the shaft 53. A pinion 58 which is provided on an upper end of a motor 57 is engaged with the gear 56 so that the shaft 53 is actuated to rotate by the motor 57 which is controlled by the microswitch 14. The switch 18 is provided to control the rotational speed of the motor 57. A stirrer 59, or a vane wheel is fixed on the middle of the shaft 53 and is located in the opening 54 in order to motivate or to sweep the seeds from the channel 513 so that the seeds can be distributed. Two lugs 521 are provided on the lower end of the body 50 for rotatably receiving an axle 91 which has two wheels 90 provided on both ends thereof. The wheels 90 are optional.

Figure 4:
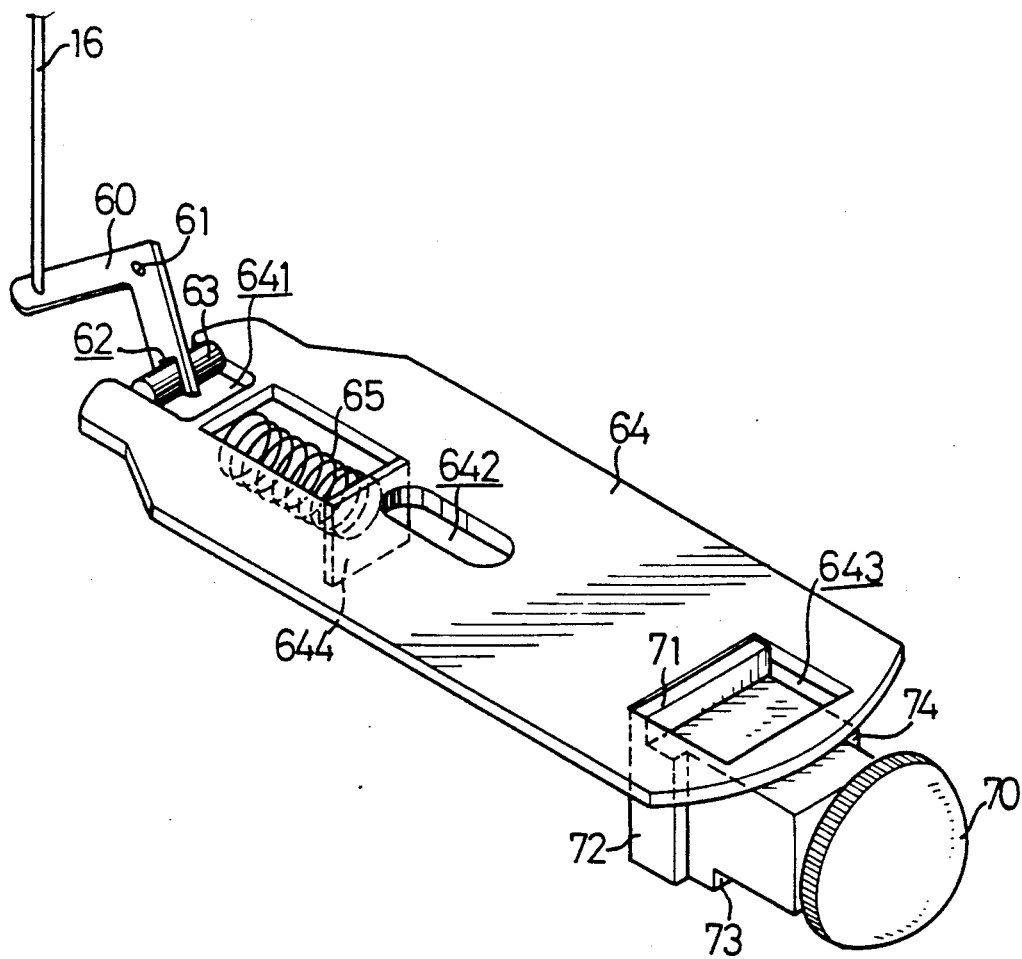
FIG. 4 is a partial perspective view of a control device of the portable distributor.

Referring next to FIG. 4 and again to FIG. 3, a middle of an L-shaped lever 60 is pivoted in the upper part 51 of the body 50. One end of the lever 60 is connected to the lower end of the cable 16. A notch 62 is formed in the other end of the lever 60. A control plate 64 is horizontally provided in the upper part 51 of the body 50. A notch 641, a oblong hole 642 and a rectangular hole 643 are respectively formed in the front, middle and rear portion of the control plate 64. A roller 63 is rotatably supported in the notch 641 and is engaged in the notch 62 of the lever 60. The shaft 53 extends through the oblong hole 642. A stop 644 extends downward from the middle portion of the control plate 64. A spring 65 is biased between the stop 644 and a block 514 which is fixed in the upper part 51 of the body 50.

Figure 5:
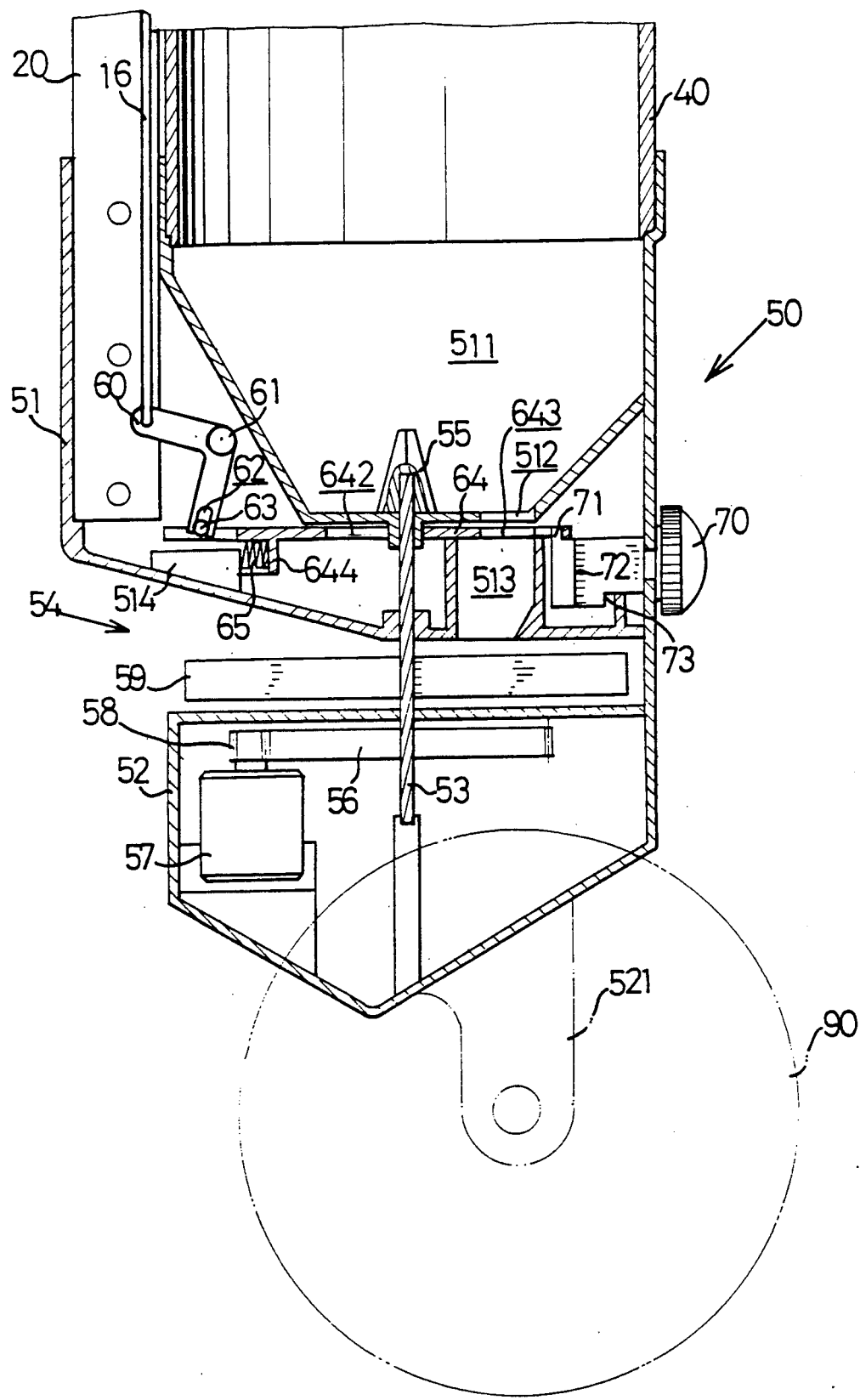
FIG. 5 is a cross sectional view similar to FIG. 3, illustrating an operating position of the portable distributor.

A knob 70 which is located outside of the body 50 is fixed to a rear end of a control block 75 which is located in the upper part 51 of the body 50. Four shoulders 71, 72, 73, 74 are formed on the respective surfaces of the control block 75. The knob 70 is rotatable so that either shoulder 71, 72, 73, 74 is engagable in the rectangular hole 643 in order to control the relative position between the aperture 512 and the rectangular hole 643; i.e. to control the opening size of the aperture 512 and to control the flow rate of the seeds through the aperture 512. The movable distance of the control plate 64 is controlled by the engagement between the aperture 643 and the shoulders 71, 72, 73, 74. As shown in FIG. 5, the shoulder 71 is engaged with the aperture 643. In this case, the control plate 64 moves to the leftmost position thereof. The spring 161 is provided such that the movable distance of the front end of the trigger 12 is not necessary proportional to the movable distance of the control plate 64; i.e., the front end of the trigger 12 can move to an uppermost position and be retained by the hook 132 when the aperture 643 is engaged with either shoulder 71, 72, 73 or 74.

Referring again to FIGS. 2 and 3, the operation of the distributor is described as follows. Initially, as shown in FIG. 3, the control plate 64 is pushed rearward by the spring 65 so that the aperture 512 is closed by the control plate 64. When the trigger 12 is pulled upward by a user, the retaining plate 13 is caused to move forward by the engagement between the front end of the trigger 12 and the tapered surface 134 of the retaining plate 13. At this moment, the microswitch 14 is actuated by the protuberance 133 of the retaining plate 13 which depresses the resilient element 141 downward. The stirrer 59 is actuated to rotate by the motor 57 which is controlled by the microswitch 14. The retaining plate 13 is biased rearward by the spring 15 when the front end of the trigger 12 is retained by the hook 132 so that the resilient element 141 is not depressed by the protuberance 133. Simultaneously, when the trigger 12 is pulled upward, the lever 60 is actuated to rotate clockwise by the cable 16 so that the control plate 64 is pulled forward by the engagement between the lever 60 and the roller 63 until the shoulder 71 contacts the rear surface of the rectangular hole 643, as shown in FIG. 5. Then, the seeds or fertilizer in the tank 40 may flow through the aperture 512, the rectangular hole 643 and the channel 513 into the opening 54 and may be distributed by the stirrer 59.

When the button 131 is pushed forward to release the trigger 12, the protuberance 133 is caused to depress the resilient element 141 again. At this moment, the microswitch 14 is not turned off yet, the motor 57 still works in order to distribute the remained seeds or fertilizer in the opening 54 after the aperture 512 is closed by the control plate 64. The motor 57 stops working when the protuberance 133 is caused to move rearward from the engagement with the resilient element of the microswitch 14 by the spring 15.

Accordingly, the portable distributor in accordance with the present invention can distribute seeds or fertilizer homogeneously and evenly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A portable distributor comprising a handle portion coupled to a body by a rod; a retaining element being horizontally and movably provided in an upper end of said handle portion, a button being fixed on an upper and front end of said retaining element and extending beyond an upper surface of said handle portion; a rear end of a trigger being pivoted to said handle portion; one end of a cable being connected to a front end of said trigger; a spring being biased between said retaining element and said trigger for biasing said trigger downward and biasing said retaining element rearward, said front end of said trigger being retained by said retaining element when said trigger is pulled upward by a user, said trigger being released when said retaining element is pushed forward by said button; a microswitch being provided in said handle portion, a resilient element being provided on said microswitch; a protuberance being formed on said retaining element, said resilient element of said microswitch being depressed by said protuberance of said retaining element when said resilient element is caused to move forward; a tank being disposed upon said body for receiving contents to be distributed; a hollow space being formed in an upper end of said body for receiving a lower end of said tank, an aperture being formed in a lower end of said hollow space, said body being substantially separated into an upper part and a lower part by an opening, a control means being provided in said upper part of said body below said hollow space and being coupled to an other end of said cable, said aperture being controlled to be opened or closed by said control means which is controlled by said trigger via said cable, said aperture being opened when said trigger is pulled upward so that said contents may flow into said opening therethrough; a shaft being rotatably provided between said upper part and said lower part of said body, a stirrer which is located in said opening being fixed to said shaft; a motor which is coupled to said shaft for driving said shaft being controlled by said microswitch; and when said aperture is opened, said contents which flow into said opening via said aperture being motivated by said stirrer in order to be distributed.

2. A portable distributor comprising a handle portion coupled to a body by a rod; a tank disposed upon said body for receiving contents to be distributed; one end of a trigger being pivoted to said handle portion; one end of a cable being connected to an other end of said trigger; a hollow space being formed in an upper end of said body for receiving a lower end of said tank, an aperture being formed in a lower end of said hollow space, said body being substantially separated into an upper part and a lower part by an opening, a control means being provided in said upper part of said body below said hollow space and including a lever, a middle portion of said lever being pivoted to said upper part of said body, one end of said lever being connected to a lower end of said cable, the other end of said lever being coupled to one end of a control plate which is horizontally provided in said upper part of said body below said hollow space, a first hole being formed in said control plate, and said control plate being caused to move by said trigger in order to control a relative position between said aperture and said first hole so as to control an opening state of said aperture; a stop extending downward from said control plate, a spring being biased between said stop and an inner wall of said upper part of said body so that said control plate is biased rearward by said spring; a shaft being rotatably provided between said upper part and said lower part of said body, a stirrer which is located in said opening being fixed to said shaft; a motor being coupled to said shaft for driving said shaft; and when said aperture is opened, said contents which flow into said opening via said aperture being motivated by said stirrer in order to be distributed.

3. A portable distributor comprising a handle portion coupled to a body by a rod; a tank disposed upon said body for receiving contents to be distributed; one end of a trigger being pivoted to said handle portion; one end of a cable being connected to an other end of said trigger; a hollow space being formed in an upper end of said body for receiving a lower end of said tank, an aperture being formed in a lower end of said hollow space, said body being substantially separated into an upper part and a lower part by an opening, a control means being provided in said upper part of said body below said hollow space and including a lever, a middle portion of said lever being pivoted to said upper part of said body, one end of said lever being connected to a lower end of said cable, the other end of said lever being coupled to one end of a control plate which is horizontally provided in said upper part of said body below said hollow space, a first hole being formed in said control plate, and said control plate being caused to move by said trigger in order to control a relative position between said aperture and said first hole so as to control an opening state of said aperture; a control block being fixed to a knob which is located outside of said upper part of said body, said control block being substantially a rectangular parallelepiped with a shoulder formed on each surface thereof, said shoulders being separated from said knob with different lengths, either shoulder of said control block being engaged within said first hole so as to control said relative position between said aperture and said first hole, and a flow rate of said contents through said aperture being controlled by said relative position between said aperture and said first hole; a shaft being rotatably provided between said upper part and said lower part of said body, a stirrer which is located in said opening being fixed to said shaft; a motor being coupled to said shaft for driving said shaft; and when said aperture is opened, said contents which flow into said opening via said aperture being motivated by said stirrer in order to be distributed.

4. A portable distributor according to claim 3, wherein a spring is provided in said cable so that said front end of said trigger can move a longer distance than said control plate.

* * * * *